United States Patent [19]
Ohta et al.

[11] Patent Number: 4,985,471
[45] Date of Patent: Jan. 15, 1991

[54] RADIATION CURABLE PRESSURE SENSITIVE ADHESIVE COMPOSITION

[75] Inventors: Tomohisa Ohta, Tochigi; Hiroyuki Hagiwara, Shimodate; Hisashige Kanbara, Shimodate; Akihiko Dobashi, Shimodate; Yasuyuki Seki, Hitachi, all of Japan

[73] Assignee: Hitachi Chemical Company Ltd., Tokyo, Japan

[21] Appl. No.: 183,633

[22] Filed: Apr. 19, 1988

[30] Foreign Application Priority Data

Apr. 20, 1987 [JP] Japan ................................. 62-97199

[51] Int. Cl.$^5$ ............................................. C08F 2/46
[52] U.S. Cl. ................................. 522/27; 522/182; 526/220; 526/222; 526/348.2
[58] Field of Search ............................................. 522/27

[56] References Cited

U.S. PATENT DOCUMENTS 3,843,502 10/1974 Pearson et al. .................... 522/27
4,144,154 3/1979 Zapp et al. ........................ 522/27
4,275,142 6/1981 Hosaka et al. .................... 522/65

Primary Examiner—Marion E. McCamish
Assistant Examiner—Susan Berman
Attorney, Agent, or Firm—Antonelli, Terry, Stout & Kraus

[57] ABSTRACT

A radiation curable pressure sensitive adhesive composition comprising:
(A) 100 parts by weight of a hydrogenated polybutadiene liquid oligomer which has one or more ethylenically unsaturated terminal radicals in its molecule and in which 70% or more of intramolecular carbon-carbon double bonds has been hydrogenated;
(B) from 0.2 to 20 parts by weight of a chain transfer agent; and
(C) from 0.001 to 1.0 parts by weight of a thermal polymerization inhibitor selected from metal complexes of N-nitrosophenylhydroxylamine;

has an excellent storage stability and curing property and can provide pressure sensitive adhesive tapes which have excellent heat resistance and weatherability and are suitably used as surface protecting films.

8 Claims, No Drawings

RADIATION CURABLE PRESSURE SENSITIVE ADHESIVE COMPOSITION

BACKGROUND OF THE INVENTION (a) Field of the Invention

The present invention relates to a radiation curable pressure sensitive adhesive composition. More specifically, the present invention relates to a radiation curable pressure sensitive adhesive composition which has an excellent storage stability and curing property and can provide pressure sensitive adhesive tapes which have excellent heat resistance and weatherability and are suitably used as surface protecting films.

(b) Description of the Prior Art

Heretofore, pressure sensitive adhesive tapes have been produced by applying a conventional pressure sensitive adhesive, in which a high molecular weight polymer such as natural rubbers, synthetic rubbers, etc, is dissolved in an organic solvent, to a substrate such as plastic films, etc. followed by drying the pressure sensitive adhesive to remove the solvent.

However, with the view of resources-saving, energy-saving, and preventing environmental pollution, solventless pressure sensitive adhesives have been in demand in recent years. To meet the demand for solventless pressure sensitive adhesives, there have been proposed as a measure various radiation curable pressure sensitive adhesives employing liquid oligomers. Such pressure sensitive adhesives comprise a liquid oligomer having a relatively low molecular weight and are coated on a substrate and are then irradiated with an ionizing radiation to make the liquid oligomer into a macromolecular polymer. The liquid oligomers to be used have ethylenically unsaturated radicals in their molecules which enable the radiation curing. However, the cured products from the liquid oligomers alone do not have sufficient rubber-like elasticity nor properties essential to pressure sensitive adhesives such as adhesive strength. As disclosed in Japanese Patent Publication No. 28,318/1985, some attempts have been made to supply these properties by blending chain transfer agents or the like.

However, the compositions which are prepared by blending the liquid oligomer having ethylenically unsaturated radicals in its molecules with a chain transfer agent tend to be thickened by dark reaction during storage or be gelatinized when they are heated for facilitating coating operation, and thus tend to become unusable as pressure sensitive adhesive. Various studies have been made to improve the storage stability by preventing the dark reaction. The dark reaction is generally caused by thermal polymerization, and therefore the method of blending a thermal polymerization inhibitor such as hydroquinone, p-benzoquinone, hydroquinone methyl ether, etc. as a dark reaction inhibitor into a radiation curable pressure sensitive adhesive has been employed.

Also, Japanese Patent Laid-open No. 152,809/1975 discloses a method of preventing the deterioration of storage stability by admixing fine bubbles of oxygen or a oxygen mixed gas into the pressure sensitive adhesives.

However, even the methods employing thermal polymerization inhibitors have defects. That is, the conventional thermal polymerization inhibitors cannot provide sufficient effect in inhibiting dark reaction while inhibit polymerization at the time of curing (polymerization) by irradiating a radiation. The method of dispersing oxygen gas also has a problem in operability.

SUMMARY OF THE INVENTION

Thus, the object of the present invention is to provide a pressure sensitive adhesive composition which would not be inhibited from being cured (polymerized) at radiation curing and has excellent storage stability and curing property.

The present invention provides a radiation curable pressure sensitive adhesive composition which comprises a pressue sensitive adhesive component consisting essentially of a liquid oligomer having a specific structure; a chain transfer agent; and a specific thermal polymerization inhibitor.

That is, according to the present invention, there is provided a radiation curable pressure sensitive adhesive composition comprising;

(A) 100 parts by weight of a hydrogenated polybutadiene liquid oligomer which has one or more ethylenically unsaturated terminal radicals in its molecule and in which 70% or more of intramolecular carbon-carbon double bonds has been hydrogenated;

(B) from 0.2 to 20 parts by weight of a chain transfer agent; and (C) from 0.001 to 1.0 parts by weight of a thermal polymerization inhibitor selected from metal complexes of N-nitrosophenylhydroxylamine.

Herein, ethylenically unsaturated terminal radical means a terminal radical having a terminal carbon-carbon double bond therein.

Hereafter, the present invention will be described in detail.

DESCRIPTION OF THE PREFERRED EMBODIMENTS

The hydrogenated polybutadiene liquid oligomer to be used in the present invention, which has one or more ethylenically unsaturated terminal radicals in its molecule and in which 70% or more of intramolecular carbon-carbon double bonds has been hydrogeneted, can be synthesized by homopolymerizing or copolymerizing one or more of the butadienes represented by the following general formula [I] by means of 1,4-polymerization such as 1,4-cis polymerization or 1,4-trans polymerization, 1,2-polymerization or 3,4-polymerization, or any combination thereof; or by copolymerizing one or more of the butadienes represented by the following general formula [I] with a small amount of an α-olefin to obtain a polybutadiene liquid oligomer, hydrogenating 70% or more of intramolecular carbon-carbon double bonds of thus obtained polybutadiene liquid oligomer, and further introducing one or more ethylenically unsaturated terminal radicals to the main chain of the hydrogenated polybutadiene liquid oligomer;

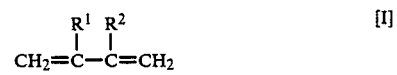

wherein each $R^1$ and $R^2$ independently represents a substituent, for example, hydrogen atom, a hydrocarbon radical such as an $C_1$-$C_{10}$ alkyl radical, a $C_6$-$C_{10}$ cyclo alkyl radical, an $C_6$-$C_{10}$ aryl radical, and an $C_7$-$C_{10}$ alaryl radical, a halogen radical, the preferred $R^1$ and $R^2$ being hydrogen atom, an $C_1$-$C_{10}$ alkyl radical, chlorine radical, etc., the particularly preferred $R^1$ and $R^2$ being hydrogen atom, methyl radical, chlorine radical, etc.

If the percentage of hydrogenation is less than 70%, the product pressure sensitive adhesive tends to become unusable because it is thickened during storage by dark reaction caused by the chain transfer agent employed.

The illustrative examples of the polybutadiene liquid oligomer which is the backbone or parent body of the above-mentioned hydrogenated polybutadiene liquid oligomer include for example polybutadiene or substituted butadiene oligomer such as 1,2-polybutadiene, 1,4-cis-polybutadiene, 1,4-trans-polybutadiene, polyisoprene, poly-2ethyl-1,3-butadiene, poly-2,3-dimethyl-1,3-butadiene, poly-2-propyl-1,3-butadiene, poly-2-isopropyl-1,3-butadiene, poly-2-butyl-1,3-butadiene, poly-2-isobutyl-1,3-butadiene, poly-2-tert-butyl-1,3-butadiene, poly-2-pentyl-1,3-butadiene, poly-2-isohexyl-1,3-butadiene, poly-2-cyclohexyl-1,3-butadiene, poly-2-n-heptyl-1,3-butadiene, poly-2-n-decyl-1,3-butadiene, poly-2-isodecyl-1,3-butadiene, polychloroprene, poly-2,3-dichloro-1,3-butadiene, etc.; polybutadiene or butadiene cooligomer comprising two or more kinds of repeating units selected from the repeating units constituting the above-mentioned polybutadiene or substituted butadiene oligomer; and the like. The particularly preferred hydrogenated polybutadiene liquid oligomers are those whose backbone structure is a 1,2-polybutadiene oligomer synthesized by living anionic polymerization.

The illustrative examples of the carbon-carbon double bonds in the ethylenically unsaturated terminal radical of the hydrogenated polybutadiene liquid oligomer include vinyl ester type carbon-carbon double bond, vinyl ether type carbon-carbon double bond, acrylic ester type carbon-carbon double bond, methacrylic ester type carbon-carbon double bond, acrylic amide type carbon-carbon double bond, methacrylic amide type carbon-carbon double bond, and the like, and the illustrative examples of the ethylenically unsaturated terminal radicals include vinyloxy radical, vinyloxycarbonyl radical, acryloyl radical, methacryloyl radical, acryloylamido radical, methacryloylamido radical, allyl radical, allyloxy radical, allylthio radical, vinylthio radical, and the like.

These ethylenically unsaturated terminal radicals may either be directly attached by introducing one or more of the substituents of one or more kinds into the above-mentioned hydrogenated polybutadiene liquid oligomers or cooligonmers or indirectly attached through an chain elongating agent having a bivalent radical.

The hydrogenated polybutadiene liquid oligomer to be used in the present invention has preferably from one to two ethylenically unsaturated terminal radicals above-mentioned per one molecule.

Further, particularly preferred hydrogenated polybutadiene liquid oligomer to be used in the present invention is one wherein the ethylenically unsaturated terminal radicals are attached to both terminals of the main chain. Such a hydrogenated polybutadiene liquid oligomer can be synthesized, for example, by directly reacting a liquid polybutadiene liquid oligomer or cooligomer having hydroxyl radicals attached to both terminals of the main chain obtained by a known method with an unsaturated compound which contains a terminal carbon-carbon doudle bond and has a radical ready to react with the said terminal hydroxyl radicals such as isocyanato radical, or by indirectly attaching a liquid hydrogenated polybutadiene oligomer or cooligomer having hydroxyl radical attached to both terminals of the main chain with a compound having a terminal carbon-carbon double bond and a hydroxyl radical such as alcoholic hydroxyl radical, through a divalent compound ready to react with hydroxyl radical such as a diisocyanate compound, etc.

The hydrogenation of polybutadiene liquid ologomer may be carried out by using known method for hydrogenating unsaturated double bonds. For example, it can be carried out by reacting the polybutadiene liqiud oligomer with hydrogen in the presence of a catalyst for hydrogenation such as platinum catalyst.

The hydrogenated polybutadiene liquid oligomer may be used individually, and also two or more kinds of these oligomers may be used in combination.

The hydrogenated polybutadiene liquid oligomer to be used in the present invention, in order to coat on a substrate in their solventless form and to cure by irradiation, should remain in liquid state at temperatures of from room temperature to 80° C. The oligomer having a viscosity of not more than 50,000 cps as measured at 50° C. is more suitable for coating.

The weight average molecular weight of the hydrogenated polybutadiene liquid oligomer to be used in the present invention is preferably in the range from 200 to 10,000. If the weight average molecular weight of the oligomer exceeds 10,000, it becomes difficult to remain in liquid state even at 80° C., which is the upper limit of the temperature range at which coating can be conducted, and if it is less than 200, good adhesive strength cannot be obtained because of an excessive crosslinking at the time of radiation curing.

Some illustrative examples of the chain transfer agents to be used in the present invention include thiol compounds such as butyl mercaptan, lauryl mercaptan, octyl thioglycolate, ethylene gylcol bis(thioglycolate), 1,4-butanediol bis(thipropionate), trimethylolpropane tris(thioglycolate), trimethylolpropane tris($\beta$-thiopropionate), pentaerythritol tetrakis($\beta$-thiopropionate), etc., disulfides such as diphenyl disulfide, etc., halides such as carbon tetrachloride, carbon tetrabromide, chloroform, dichlorobenzene, etc. These chain transfer agents may be used individually or as a mixture thereof.

The chain transfer agent is added in order to inhibit excessive crosslinking at the time of radiation curing, and for this purpose, it is necessary to add the chain transfer agent in an amount of from 0.2 to 20 parts by weight, preferably from 2 to 15 parts by weight per 100 parts by weight of the hydrogenated polybutadiene liquid oligomer. If this amount is less than 0.2 parts by weight, the crosslinking inhibiting effect is insufficient, and if it exceeds 20 parts by weight, the curing is insufficient so that the cohesive strength is insufficient resulting in adverse influence on the adhesion characteristics.

The thermal polymerization inhibitor to be used in the present invention is a metal complex of N-nitrosophenylhydroxylamine represented by the following general formula [II]

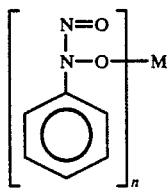

[II]

wherein M represents a cation selected from metals included in the main-groups or sub-groups of groups I–III or in the sub-group of group VIII in periodic table, and n represents a number equal to the valence of M.

The illustrative examples of the metal, M, in the above general formula [II] include sodium, potassium, magnesium, strontium, aluminum, copper, zinc, cerium, iron, nickel, cobalt, etc. The most advantageous thermal polymerization inhibitor is aluminum complex of N-nitrosophenylhydroxylamine.

The thermal polymerization inhibitor should be added in an amount of from 0.001 to 1.0 part by weight per 100 parts by weight of the hydrogenated polybutadiene liquid oligomer. If this amount is less than 0.001 part by weight, the effect in improving the storage stability is insufficient, and if it exceeds 1.0 parts by weight, the radiation curing (polymerization) is inhibited. The preferable range of the amount of the thermal polymerization inhibitor to be added is from 0.01 to 0.1 part by weight per 100 parts by weight of the hydrogenated polybutadiene liquid oligomer.

The thermal polymerization inhibitor may either be previously added to the above-mentioned chain transfer agent or be added when all components are blended, and the effects of the thermal polymerization inhibitor does not vary depending of the method of addition.

The pressure sensitive adhesive composition of the present invention basically comprises the constituents described above though, in some cases, it may further contain one or more conventional additives such as diluting monomers, tackifiers, anti-oxidants, radiation curing accelerators, UV absorbers, etc., and may also contain a small amount of solvent. The kinds, combination, amount, etc. of these additives to be used can be appropriately selected and controlled depending on the necessity.

The pressure sensitive adhesive composition of the present invention can be obtained by blending the above-mentioned components. Thus obtained pressure sensitive adhesive composition of the present invention is coated on a substrate such as a polyethylene film, etc. so that the thickness of the coated composition becomes predetermined proper thickness and is then cured by irradiating a radiation to form a pressure sensitive adhesive film.

The term "radiation" used in the present invention means an actinic energy ray including an ionizing radiation such as $\alpha$-rays, $\beta$-rays, $\gamma$-rays, neutron rays, accelerated electron beam or the like. The ionizing radiation can be used in a dose in the range from 0.5 to 50 Mrad, though the dose is preferably about 1 to 10 Mrad. Also, particular care should be taken in irradiation atmosphere. That is to say, since the radicals produced are inhibited by oxygen in the air, replacement of air with an inert gas such as nitrogen gas should be carried out if necessary.

The present invention is disclosed below in more detail referring to the following non-limiting Examples, in which all parts are by weight unless otherwise specified.

EXAMPLES 1 AND 2 AND COMPARTIVE EXAMPLES 1 TO 4

(1) Synthesis of hydrogenated radiation curable liquid oligomer having terminal acryloyl radicals A 1,2-polybutadiene oligomer (1,2-PB) having a Mw (weight average molecular weight) of about 1,000 and hydroxyl radicals attached to both terminals of the main chain was synthesized by polymerizing butadiene by a living anionic polymerization method. Subsequently, the obtained 1.2-PB was hydrogenated in the presence of a platnium catalyst. The percentage of hydrogenation of the intramolecular carbon-carbon double bonds was 90%. To 1 mol of the hydrogenated 1,2-PB was added 2 mol of tolyenediisocyanate (TDI) to attach isocyanato radicals (—NCO) to both terminals of the main chain and was finally reacted with 1.5 mol of hydroxyethyl acrylate to provide double bonds to the molecular terminals, and thus a hydrogenated 1,2-polybutadiene oligomer having a viscosity of 30,000 cps as measured at 50° C. was obtained.

(2) Synthesis of hydrogenated radiation curable liquid oligomer having terminal allyl radicals To 1 mol of the hydrogenated 1,2-PB having a hydrogenation percentage of 90% obtained in (1) was added 2 mol of tolylenediisocyanate (TDI) to attach—NCO radicals to both terminals of the main chain. Finally, the reaction product was reacted with 2 mol of allyl alcohol to obtain a hydrogenated 1,2-polybutadiene oligomer wherein allyl radicals were attached to both terminals of the main chain. The viscosity of the obtained oligomer was 25,000 cps as measured at 50° C.

EXAMPLES 1 AND 2

To 100 parts of each of the hydrogenated 1,2-polybutadiene oligomers synthesized respectively in the above (1) and (2) were added 10 part of trimethylolpropane tris($\beta$-thiopropionate) and 0.1 part of aluminum complex of N-nitrosophenylhydroxylamine (Q-1301, produced by Wako Junyaku K. K.) to obtain a radiation curable pressure-sensitive adhesive composition.

COMPARATIVE EXAMPLES 1 AND 2

Two radiation curable pressure-sensitive adhesive compositions were prepared by the same blending ratios and procedures as of Examples 1 and 2 with the proviso that Q-1301 was not added.

COMPARATIVE EXAMPLES 3 AND 4

Two radiation curable pressure-sensitive adhesive compositions were prepared by the same blending ratios and procedures as of Examples 1 and 2 with the proviso that 0.1 part of hydroquinone methyl ether (HQME) was added in each composition in place of Q-1301.

APPLICATION EXAMPLE

The pressure-sensitive adhesive compositions each obtained in the above examples and compartive examples were allowed to stand in thermostatic chambers at 50° C. to evaluate the storage stability.

Pressure sensitive adhesive tapes were formed by coating each pressure sensitive adhesive composition to a polyethylene film of 60 $\mu$m in thickness so that the thickness of the pressue sensitive adhesive layer would become 10 μm and irradiating the same with electron beam at a dose of 6 Mrad with an accelerated voltage of 200 kV and a beam current of 10 mA from a linear filament type electron beam irradiation apparatus (Electron Curtain, a trade name, manufactured by Energy Science Inc.) in a nitrogen gas atmosphere (oxygen ($O_2$) concentration: 500 ppm). The adhesive strength of each pressure-sensitive adhesive tape was measured by mens of a Tensilon-type tensile tester. The tensile speed employed was 200 mm/min (20° C.).

Further, each pressure sensitive adhesive tape was adhered to a SUS-430BA plate and peeled after 2 hours, and then it was observed by visual observation whether or not the pressure sensitive adhesive was transferred to the surface of the plate to evaluate the curing property. The pressure sensitive adhesive tapes which showed nothing wrong in the curing property test were subjected to heat resistance test and accelerated weatherability test. The heat resistance test was conducted by allowing each pressure sensitive adhesive tape adhered to a SUS-430BA plate to stand in a thermostatic chamber at 80° C. for 7 days, and the accelerated weatherability test was conducted using a Sunshine Weather Meter (ATRAS CDMC type, closed method with carbon arc).

The results are shown in Table 1.

TABLE 1

|  | (a) Storage stability (50° C.) | Adhesive strength (gf/25 mm, 20° C.) | (b) Curing property | (c) Heat resistance | (d) Weatherability |
| --- | --- | --- | --- | --- | --- |
| Example 1 | >30 days | 120 | No transference | 2.0 No transference | 120 hours |
| Comparative Example 1 | 1 day | 125 | No transference | 3.8 A great part was transferred. | 60 hours |
| Comparative Example 3 | 3 days | 135 | A part was transferred. | 4.5 A great part was transferred. | <20 hours |
| Example 2 | >30 days | 280 | No transference | 3.2 No transference | 110 hours |
| Comparative Example 2 | half a day | 290 | No transference | 4.1 A great part was transferred. | 50 hours |
| Comparative Example 4 | 1 day | 250 | A part was transferred. | 3.8 A part was transferred. | <20 hours |

(a) Time required to gellation to occur.
(b) Visual observation was carried out to observe whether or not the pressure sensitive adhesive transferred to the surface of the plate.
(c) The numerals exhibit magnification ratio of the adhesive strength (gf/25 mm, 20° C.) after heating treatment to the initial adhesive strength. From the viewpoint of the peeling properties, the smaller the magnification ratio is, the more preferable, and usually it required to be less than 3 times. At the same time, visual observation was carried out to observe whether or not the pressure sensitive adhesive transferred to the surface of the plate.
(d) Time required to the cohesive-failure layer of the pressure sensitive adhesive on the adherend to begin to transfer to the adherend during the accelerated weathering test with a Sunshine Weather Meter.

As evident from the results of the examples, according to the present invention, it becomes possible to provide a radiation curable pressure sensitive composition which is extremely improved in long storage stability by blending a metal complex of N-nitrosophenylhydroxylamine and is as well improved in curing property, heat resistance, and weatherability without using conventional polymerization inhibitors of radical scavenger type.

What is claimed is:

1. A radiation curable pressure sensitive adhesive composition comprising:
   (A) 100 parts by weight of a hydrogenated 1,2-polybutadiene liquid oligomer which has one or more ethylenically unsaturated terminal radicals in its molecule and in which 70% or more of intramolecular carbon-carbon double bonds has been hydrogenated, said one or more ethylenically unsaturated terminal radicals being attached at both terminals of a main chain of the hydrogenated 1,2-polybutadiene liquid oligomer and the main chain of the hydrogenated 1,2-polybutadiene liquid oligomer being prepared by living anionic polymerization;
   (B) from 0.2 to 20 parts by weight of a chain transfer agent selected from the group consisting of ethylene glycol bis(thioglycolate), 1,4-butanediol bis(thiopropionate), trimethylolpropane tris(thioglycolate), trimethylolpropane tris(β-thiopropionate), and pentaerythritol tetrakis(β-thiopropionate); and
   (C) from 0.001 to 1.0 parts by weight of a thermal polymerization inhibitor selected from metal complexes of N-nitrosophenylhydroxylamine.

2. The radiation curable pressure sensitive adhesive composition according to claim 1, wherein said ethylenically unsaturated terminal radical is selected from the group consisting of vinyloxy radical, vinyloxycarbonyl radical, acryloyl radical, methacryloyl radical, acrylamido radical, methacryloylamido radical allyl, radical, allyloxy radical, allylthio radical, and vinylthio radical.

3. The radiation curable pressure sensitive adhesive composition according to claim 1, wherein said hydrogenated 1,2-polybutadiene oligomer has a weight average molecular weight of 2,000 to 10,000 and has a viscosity of not more than $5 \times 10^5$ cps at 50° C.

4. The radiation curable pressure sensitive adhesive composition according to claim 1, wherein said chain transfer agent is trimethylolpropane tris(β-thiopropionate).

5. The radiation curable pressure sensitive adhesive composition according to claim 1, wherein said thermal polymerization inhibitor is aluminum complex of N-nitrosophenylhydroxylamine.

6. The radiation curabole pressure sensitive adhesive composition according to claim 1, wherein said oligomer is obtained by 1,2-polymerization of $CH_2=CHR^1—CR^2=CH_2$ wherein each $R^1$ and $R^2$ independently represent a hydrogen atom, a $C_1$-$C_{10}$ alkyl radical, a $C_6$-$C_{10}$ cycloalkyl radical, a $C_6$-$C_{10}$ aryl radical, a $C_7$-$C_{10}$ alaryl radical or a halogen radical.

7. The radiation curable pressure sensitive adhesive composition according to claim 6, wherein $R^1$ and $R^2$ represent a hydrogen atom, a $C_1$-$C_{10}$ alkyl radical or a chlorine radical.

8. The radiation curable pressure sensitive adhesive composition according to claim 6, wherein $R^1$ and $R^2$ independently represent a halogen atom, a methyl radical or a chlorine radical.

* * * * *